United States Patent
Choi et al.

(10) Patent No.: US 9,802,598 B2
(45) Date of Patent: Oct. 31, 2017

(54) SYSTEM AND METHOD FOR CONTROLLING HYBRID ELECTRIC VEHICLE USING DRIVING TENDENCY OF DRIVER

(71) Applicants: Hyundai Motor Company, Seoul (KR); Kia Motors Corporation, Seoul (KR)

(72) Inventors: Yongkak Choi, Seoul (KR); Hoon Han, Hwaseong (KR); Ilkwon Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/560,182

(22) Filed: Dec. 4, 2014

(65) Prior Publication Data

US 2016/0009271 A1    Jan. 14, 2016

(30) Foreign Application Priority Data

Jul. 8, 2014 (KR) .......................... 10-2014-0085346

(51) Int. Cl.
*B60W 20/00* (2016.01)
*B60W 10/06* (2006.01)
(Continued)

(52) U.S. Cl.
CPC ............ *B60W 10/11* (2013.01); *B60W 10/06* (2013.01); *B60W 10/08* (2013.01); *B60W 20/13* (2016.01);
(Continued)

(58) Field of Classification Search
CPC ...... B60W 10/06; B60W 10/08; B60W 10/11; B60W 20/106
(Continued)

(56) References Cited

U.S. PATENT DOCUMENTS

| | | | | |
|---|---|---|---|---|
| 6,128,564 A | * | 10/2000 | Graf ...................... | B60W 10/06 477/102 |
| 6,553,301 B1 | * | 4/2003 | Chhaya .................... | B60K 6/54 701/54 |
| 7,171,299 B1 | * | 1/2007 | Stroh .................. | F02D 41/0225 701/110 |

FOREIGN PATENT DOCUMENTS

| | | |
|---|---|---|
| JP | 2008-087533 A | 4/2008 |
| JP | 2010-052610 A | 3/2010 |

(Continued)

*Primary Examiner* — Redhwan K Mawari
*Assistant Examiner* — Anshul Sood
(74) *Attorney, Agent, or Firm* — Mintz Levin Cohn Ferris Glovsky and Popeo, P.C.; Peter F. Corless (57) ABSTRACT

A system and method for controlling a hybrid electric vehicle using a driving tendency are provided. The method includes determining a driving tendency level based on data to determine a driving tendency of a driver and determining a target engine torque using an engine torque map based on a vehicle speed and a required torque. Whether the driving tendency level corresponds to a predetermined level is determined as well as whether the required torque is equal to or greater than a torque that corresponds to an optimal operating point of an engine when the driving tendency level corresponds to the predetermined level. The target engine torque is then adjusted when the required torque is equal to or greater than the torque that corresponds to the optimal operating point of the engine.

9 Claims, 8 Drawing Sheets

(51) Int. Cl.
*B60W 10/08*  (2006.01)
*B60W 10/11*  (2012.01)
*B60W 40/09*  (2012.01)
*B60W 30/188* (2012.01)
*B60W 30/182* (2012.01)
*B60W 20/13*  (2016.01)

(52) U.S. Cl.
CPC ...... *B60W 30/182* (2013.01); *B60W 30/1882* (2013.01); *B60W 40/09* (2013.01); *Y02T 10/6286* (2013.01); *Y10S 903/93* (2013.01)

(58) Field of Classification Search
USPC .......................................................... 701/22
See application file for complete search history.

(56) References Cited

FOREIGN PATENT DOCUMENTS

| | | |
|---|---|---|
| JP | 2010-071299 A | 4/2010 |
| KR | 10-2002-0089920 A | 11/2002 |
| KR | 10-2004-0001774 A | 1/2004 |
| KR | 10-2008-0007416 A | 1/2008 |
| KR | 10-2008-0015236 A | 2/2008 |
| KR | 10-2012-0060067 A | 6/2012 |
| KR | 2013-0074193 A | 7/2013 |
| KR | 10-2013-0136780 | 12/2013 |
| KR | 101371476 B1 | 3/2014 |

* cited by examiner

SYSTEM AND METHOD FOR CONTROLLING HYBRID ELECTRIC VEHICLE USING DRIVING TENDENCY OF DRIVER

CROSS-REFERENCE TO RELATED APPLICATION

This application claims priority to and the benefit of Korean Patent Application No. 10-2014-0085346 filed in the Korean Intellectual Property Office on Jul. 8, 2014, the entire contents of which are incorporated herein by reference.

BACKGROUND

Field of the Invention

The present invention relates to a system and method for controlling a hybrid electric vehicle. More particularly, the present invention relates to a system and method for controlling a hybrid electric vehicle using a driving tendency of a driver.

Description of the Related Art

As well-known, a hybrid electric vehicle efficiently combines power of an internal combustion engine and power of a motor and uses the combined power to drive the vehicle. The hybrid electric vehicle generally includes an engine, a motor, an engine clutch configured to adjust power between the engine and the motor, a transmission, a differential gear device, a battery, an integrated starter and generator (ISG) configured to start the engine or generate electric power by an output of the engine, and wheels. The integrated starter and generator may be called a hybrid starter and generator (HSG).

The hybrid electric vehicle provides driving in an electric vehicle (EV) mode in which the power of the motor is used by coupling or decoupling the engine clutch depending on an acceleration or deceleration intention based on a manipulation of an accelerator pedal and a brake pedal by a driver, a vehicle speed, a state of charge (SOC) of the battery, and the like; a hybrid electric vehicle (HEV) mode in which a torque of the engine is used as main power and a torque of the motor is used as auxiliary power; a regenerative braking mode in which braking and inertial energy are recovered through electric power generation of the motor during braking the vehicle or during driving the vehicle by inertia to be charged in the battery.

Since the hybrid electric vehicle uses both of mechanical energy of the engine and electrical energy of the battery, uses optimal operation regions of the engine and the motor, and recovers the energy at the time of braking the vehicle, fuel efficiency may be improved, and the energy may be efficiently used. However, a deviation may be generated in fuel efficiency and the SOC of the battery of the hybrid electric vehicle based on a driving tendency of a driver.

In addition, a satisfaction of the driver associated with driving performance of the hybrid electric vehicle depends on whether the hybrid electric vehicle is driven to be appropriate for the driving tendency of the driver. However, since the driving tendency of the driver varies, but a performance characteristic of the hybrid electric vehicle is fixed to one performance characteristics with respect to the same vehicle type, a difference may be generated between the driving tendency of the driver and a reaction of the hybrid electric vehicle. In other words, when the driving tendency of the driver is understood and the hybrid vehicle is operated to be appropriate for the driving tendency of the driver, the satisfaction of the driver associated with the driving performance may be maximized.

The above information disclosed in this section is merely for enhancement of understanding of the background of the invention and therefore it may contain information that does not form the prior art that is already known in this country to a person of ordinary skill in the art.

SUMMARY

The present invention provides a method for controlling a hybrid electric vehicle having advantages of optimizing a state of charge (SOC) of a battery and improving fuel efficiency using a driving tendency of a driver.

An exemplary embodiment of the present invention provides a method for controlling a hybrid electric vehicle using a driving tendency that may include: determining a driving tendency level based on data to determine a driving tendency of a driver; determining a target engine torque using an engine torque map based on a vehicle speed and a required torque; determining whether the driving tendency level corresponds to a predetermined level; determining whether the required torque is equal to or greater than a torque that corresponds to an optimal operating point of an engine when the driving tendency level corresponds to the predetermined level; and adjusting the target engine torque when the required torque is equal to or greater than the torque that corresponds to the optimal operating point of the engine.

In the adjustment of the target engine torque, the target engine torque may be increased up to a part-load max torque of the engine to decrease a motor assist torque. The method for controlling a hybrid electric vehicle using a driving tendency may further include setting a final target engine torque to the torque that corresponds to the optimal operating point of the engine when the required torque is less than the torque that corresponds to the optimal operating point of the engine.

Another exemplary embodiment of the present invention provides a method for controlling a hybrid electric vehicle using a driving tendency that may include: determining a driving tendency level based on data to determine a driving tendency of a driver; determining whether an idle lock-up charge entering condition is satisfied; and performing an idle lock-up charge control when the idle lock-up charge entering condition is satisfied, wherein the idle lock-up charge entering condition is satisfied when an engine is in a driven state, the hybrid electric vehicle is in a coasting state, and an SOC of a battery is less than or equal to an idle lock-up charge entering SOC, and the idle lock-up charge entering SOC is set based on the driving tendency level. In the idle lock-up charge control, an engine clutch may be maintained in an engaged state, and the battery may be charged through electric power generation of a motor and an integrated starter and generator.

The method for controlling a hybrid electric vehicle using a driving tendency may further include: determining whether an idle lock-up charge release condition is satisfied; and releasing the idle lock-up charge control when the idle lock-up charge release condition is satisfied, wherein the idle lock-up charge release condition is satisfied when the coasting state is released or the SOC of the battery is equal to or greater than an idle lock-up charge release SOC, and the idle lock-up charge release SOC is set based on the driving tendency level.

Yet another exemplary embodiment of the present invention provides a method for controlling a hybrid electric vehicle using a driving tendency may include: determining a driving tendency level based on data to determine a driving tendency of a driver; setting a shift pattern based on the driving tendency level; and performing a shift control based on the shift pattern. The driving tendency level may be any one of a mild level, a normal level, an aggressive level, and a racer level, and the shift pattern may be any one of a mild shift pattern that corresponds to the mild level, a normal shift pattern that corresponds to the normal level, an aggressive shift pattern that corresponds to the aggressive level, and a racer shift pattern that corresponds to the racer level. The method for controlling a hybrid electric vehicle using a driving tendency may further include: setting a creep torque map based on the driving tendency level; and performing a creep torque control using the creep torque map based on a vehicle speed and a shift stage, wherein the shift stage may be determined based on the shift pattern.

Yet still another exemplary embodiment of the present invention provides a method for controlling a hybrid electric vehicle using a driving tendency that may include: determining a driving tendency level based on data to determine a driving tendency of a driver; determining whether an engine start condition is satisfied in a state in which an engine is stopped; and performing an engine start control when the engine start condition is satisfied, wherein the engine start condition may be satisfied when power required by the driver is equal to or greater than a first threshold value, and the first threshold value may be set based on the driving tendency level.

The engine start condition may be satisfied when accumulated driving energy is equal to or greater than a second threshold value, the accumulated driving energy may be calculated based on required power during a predetermined time in a section in which a change rate of a position value of an accelerator pedal is a positive value, and the second threshold value may be set based on the driving tendency level. The method for controlling a hybrid electric vehicle using a driving tendency may further include: determining whether an engine stop condition is satisfied in a state in which the engine starts; and performing an engine stop control when the engine stop condition is satisfied, wherein the engine stop condition may be satisfied when power required by the driver is less than or equal to a third threshold value, and the third threshold value may be set based on the driving tendency level.

As described above, according to an exemplary embodiment of the present invention, the hybrid electric vehicle may be controlled using the driving tendency of the driver, thereby making it possible to optimize the SOC of the battery and improve the fuel efficiency. In addition, the intention of the driver may be more accurately reflected in the shift.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DESCRIPTION OF SYMBOLS

10: engine
20: motor
30: engine clutch
40: transmission
50: battery
60: integrated starter and generator
70: differential gear device
80: wheel
90: data detector
100: controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described more fully with reference to the accompanying drawings so as to be easily practiced by those skilled in the art to which the present invention pertains. In addition, since the respective components shown in the accompanying drawings are arbitrarily shown for convenience of explanation, the present invention is not necessarily limited to contents shown in the accompanying drawings.

Figure 1:
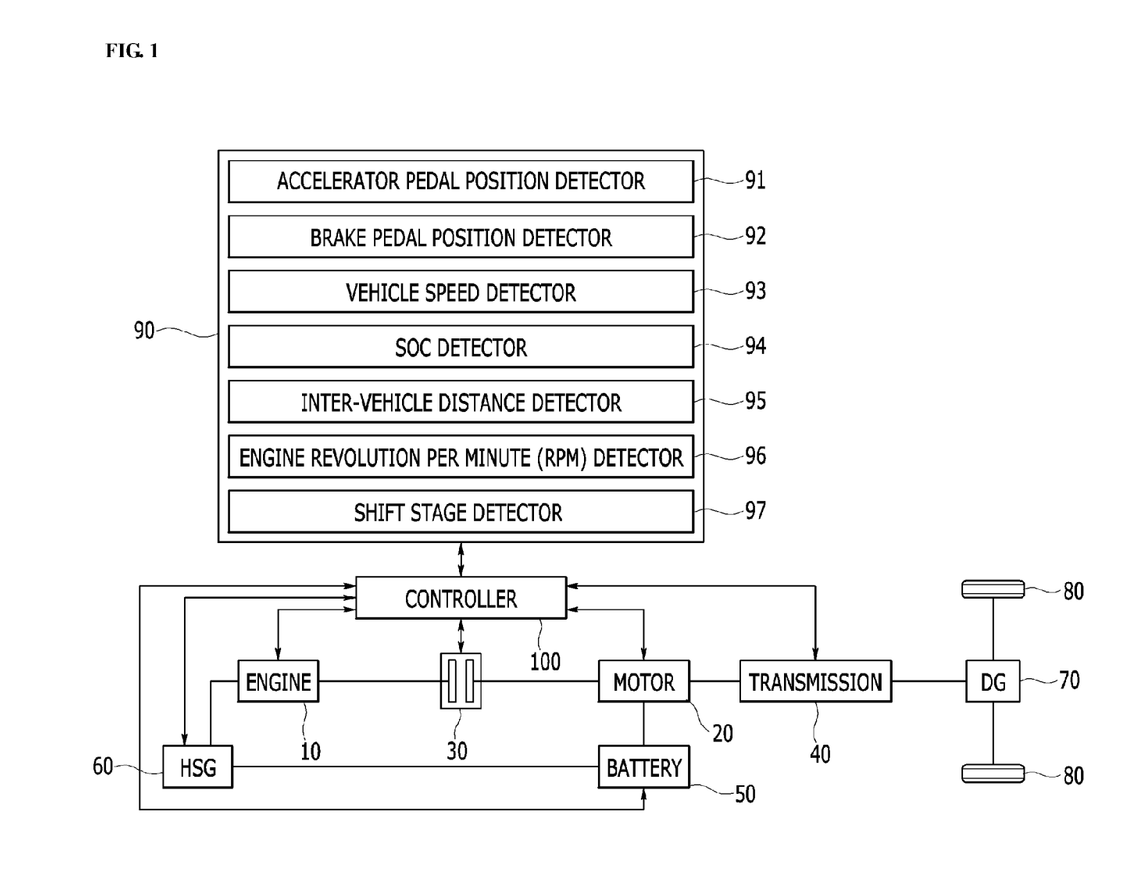
FIG. 1 is an exemplary block diagram showing a system for controlling a hybrid electric vehicle according to an exemplary embodiment of the present invention.

FIG. 1 is an exemplary block diagram showing a system for controlling a hybrid electric vehicle according to an exemplary embodiment of the present invention. As shown in FIG. 1, the system for controlling a hybrid electric vehicle according to an exemplary embodiment of the present invention may include an engine 10, a motor 20, an engine clutch 30 configured to adjust power between the engine 10 and the motor 20, a transmission 40, a battery 50, an integrated starter and generator (ISG) 60 may be configured to state the engine 10 or generate electric power by an output of the engine 10, a differential gear device 70, wheels 80, a data detector 90, and a controller 100. The controller 100 may be configured to operate the engine 10, the motor 20, the engine clutch 30, the transmission 40, the battery 50, the integrated starter and generator (ISG) 60, the differential gear device 70, the wheels 80, and the data detector 90.

In particular, power generated in the engine 10 or the motor 20 may be selectively transferred to an input shaft of the transmission 40, and power output from an output terminal of the transmission 40 may be transferred to axles through the differential gear device 70. The axles may be configured to rotate the wheels 80, to drive the hybrid electric vehicle by the power generated in the engine 10 or the motor 20. The battery 50 may be configured to store a high voltage therein, supply a driving voltage to the motor 20 in an electric vehicle (EV) mode and a hybrid electric vehicle (HEV) mode, and may be charged with electricity recovered by the motor in a regenerative braking mode.

The controller 100 may be configured to adjust output torques of the engine 10 and the motor 20 based on a state of the hybrid electric vehicle and operate the hybrid electric vehicle in the EV mode, the HEV mode, and the regenerative braking mode based on a driving condition and a state of charge (SOC) of the battery 50. The data detector 90 may be configured to detect data to determine a driving tendency of a driver, and the data detected by the data detector 90 may be transferred to the controller 100. The data detector 90 may include an accelerator pedal position sensor 91, a brake pedal position sensor 92, a vehicle speed sensor 93, an SOC sensor 94, an inter-vehicle distance sensor 95, an engine revolution per minute (RPM) sensor 96, and a shift stage sensor 97.

The accelerator pedal position sensor 91 may be configured to measure a position value of an accelerator pedal (e.g., an engagement degree of the accelerator pedal) and transfer a signal for the position value to the controller 100. When the accelerator pedal is completely engaged, the position value of the accelerator pedal may be 100%, and when the accelerator pedal is disengaged, the position value of the accelerator pedal may be 0%. A throttle valve opening degree sensor mounted in an intake passage may be used instead of the accelerator pedal position sensor 91. Therefore, it is to be considered in the present specification and the claims that the accelerator pedal position sensor 91 may include the throttle valve opening degree detector and the position value of the accelerator pedal may include an opening degree of a throttle valve.

The brake pedal position sensor 92 may be configured to measure a position value of a brake pedal (e.g., an engagement degree of the brake pedal) and transfer a signal for the position value to the controller 100. When the brake pedal is completely engaged, the position value of the brake pedal may be 100%, and when the brake pedal is disengaged, the position value of the brake pedal may be 0%. The vehicle speed sensor 93 may be configured to detect a vehicle speed and transfer a signal for the vehicle speed to the controller 100. The vehicle speed sensor 93 may be mounted within the wheel of the vehicle.

Meanwhile, a target shift stage may be calculated using a shift pattern based on the signal of the accelerator pedal position sensor 91 and the signal of the vehicle speed sensor 93, and a shift to the target shift stage may be executed. In other words, for an automatic transmission that includes a plurality of planetary gear sets and a plurality of friction elements, hydraulic pressure supplied to the plurality of friction elements or released from the plurality of friction elements may be adjusted. In addition, for a double clutch transmission, a current applied to a plurality of synchronizer mechanisms and an actuator may be adjusted.

The SOC sensor 94 may be configured to detect the SOC of the battery 50 and transfer a signal for the SOC to the controller 100. Instead of directly detecting the SOC of the battery 50, a current and a voltage of the battery 50 may be measured, and the SOC of the battery 50 may be predicted from the measured current and voltage. The inter-vehicle distance sensor 95 may be configured to detect a distance between the hybrid electric vehicle and a preceding vehicle. As the inter-vehicle distance sensor 95, various sensors such as an ultrasonic wave sensor, an infrared sensor, and the like, may be used.

The engine RPM sensor 96 may be configured to detect a revolutions per minute (RPM) of the engine from a phase change of a crank shaft and transfer a signal for the RPM of the engine to the controller 100. The shift stage sensor 97 may be configured to detect a shift stage currently engaged. The controller 100 may be implemented by at least one microprocessor operated by a predetermined program that may include a series of commands for executing each step included in a method for controlling a hybrid electric vehicle according to an exemplary embodiment of the present invention to be described below.

The controller 100 may be configured to determine a driving tendency level of the driver based on the data detected by the data sensor 90. The driving tendency level may be determined based on a driving tendency index calculated based on the data. The driving tendency index may be calculated based on how well the plurality of rules associated with the driving tendency of the driver are satisfied. The plurality of rules may be predetermined on the assumption that they are considered to be appropriate for those skilled in the art to determine the driving tendency of the driver. For example, the driving tendency index may be calculated based on the position value of the accelerator pedal, a change rate of the position value of the accelerator pedal, the position value of the brake pedal, a change rate of the position value of the brake pedal, the vehicle speed, an acceleration, an inter-vehicle distance, a change rate of the inter-vehicle distance, and the like. The driving tendency level may be any one of a mild level, a normal level, an aggressive level, and a racer level. Such levels may be predetermined based on the above driving tendency index factors. Furthermore, fuel efficiency and the SOC of the battery 50 may deteriorate in a sequence of the mild level, the normal level, the aggressive level, and the racer level. A method of calculating the driving tendency index and a method of determining the number of driving tendency levels and the driving tendency level are not limited thereto, by may be variously implemented by those skilled in the art.

The controller 100 may be configured to operate the hybrid electric vehicle based on the determined driving tendency level. In other words, the controller 100 may be configured to adjust the engine torque, adjust the SOC of the battery, perform a shift control, perform a creep torque control, and perform an engine start control, based on the driving tendency level. As described above, the hybrid electric vehicle may be appropriately controlled using the driving tendency, thereby making it possible to improve the fuel efficiency and the SOC of the battery and perform a shift to be appropriate for the driving tendency.

Figure 2:
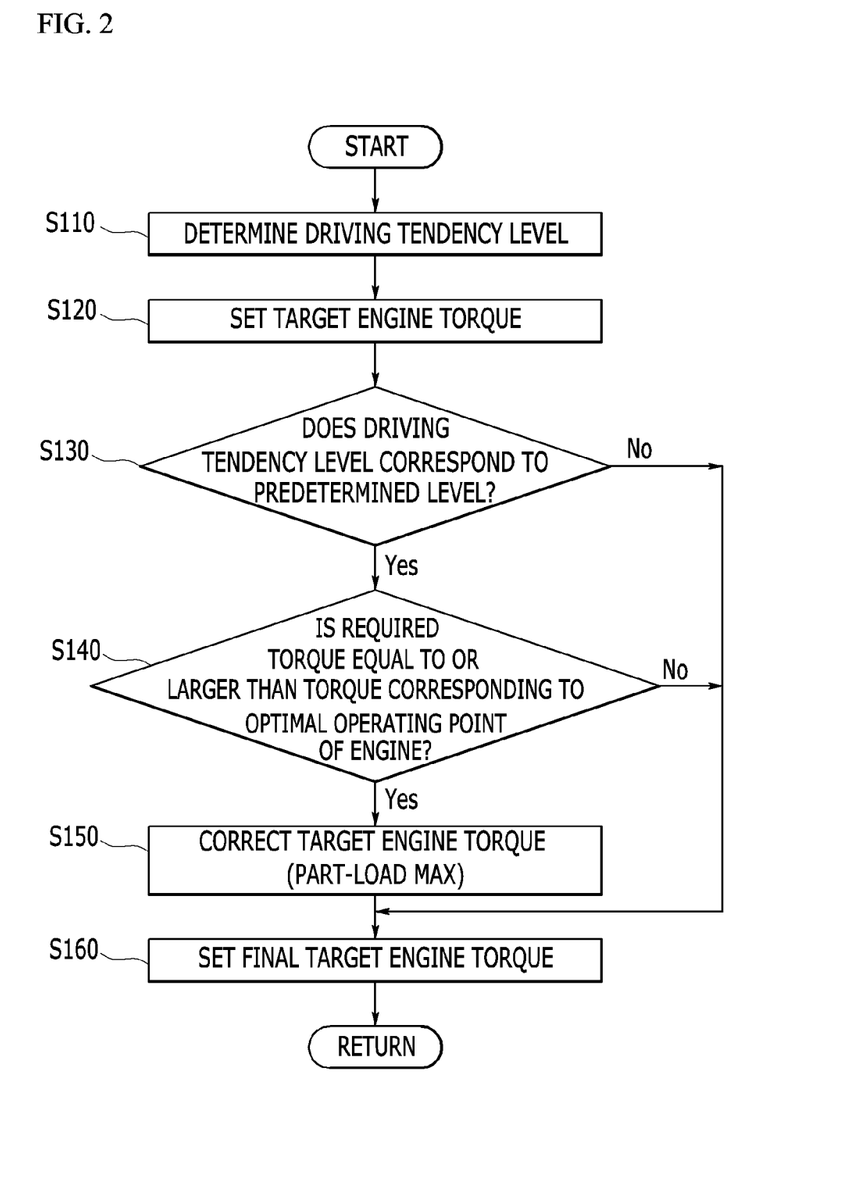
FIG. 2 is an exemplary flow chart showing a method for controlling an engine torque using a driving tendency according to an exemplary embodiment of the present invention.
Figure 3:
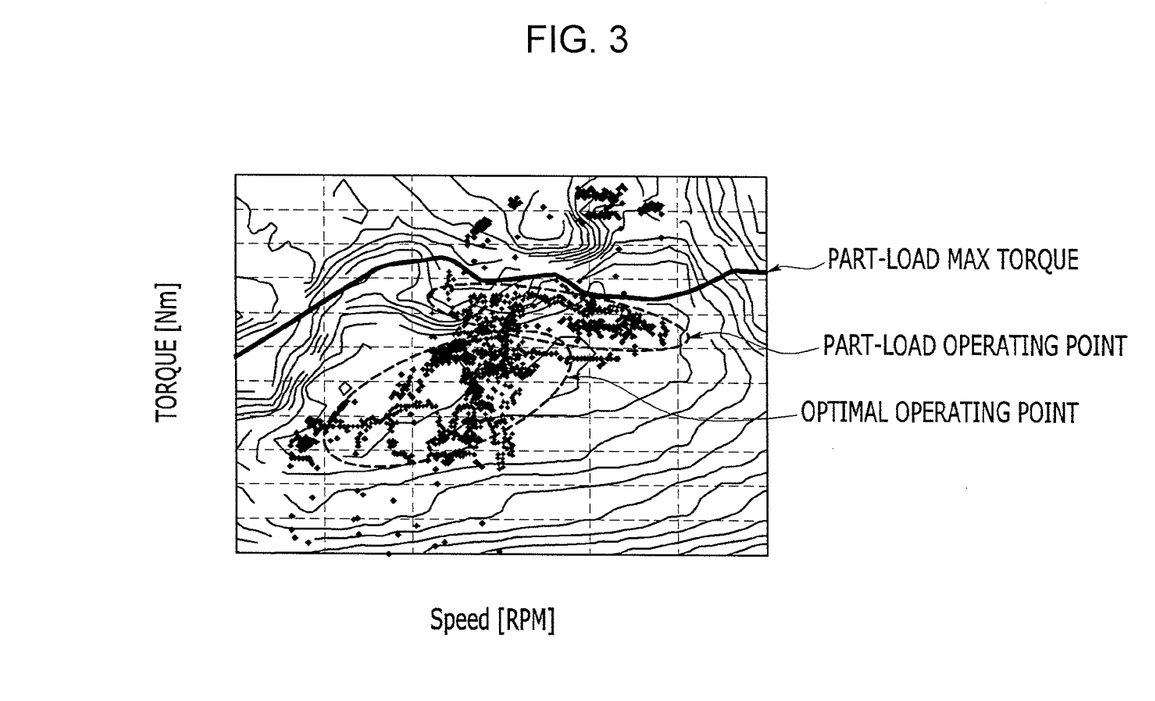
FIG. 3 is an exemplary diagram showing an engine torque map according to an exemplary embodiment of the present invention.

Hereinafter, a method for controlling a hybrid electric vehicle will be described in detail with reference to FIGS. 2 to 8. FIG. 2 is an exemplary flow chart showing a method for controlling an engine torque using a driving tendency according to an exemplary embodiment of the present invention. FIG. 3 is an exemplary diagram showing an engine torque map according to an exemplary embodiment of the present invention.

As shown in FIGS. 2 and 3, the method for controlling an engine torque according to an exemplary embodiment of the present invention starts with determining the driving tendency level based on the data to determine the driving tendency of the driver (S110). In other words, the controller 100 may be configured to calculate the driving tendency index based on the data detected by the data detector 90 and determine the driving tendency level of the driver based on the driving tendency index. The driving tendency level may be any one of the mild level, the normal level, the aggressive level, and the racer level.

The controller 100 may be configured to set a target engine torque using an engine torque map based on the vehicle speed and a required torque (S120). The required torque of the driver may be calculated based on the position value of the accelerator pedal and the vehicle speed, and a target engine torque that corresponds to a given condition may be stored in the engine torque map. Usually, a torque that corresponds to an optimal operating point of the engine may be set to the target engine torque. When the driving tendency level is determined, the controller 100 may be configured to determine whether the driving tendency level corresponds to a predetermined level (S130). The predetermined level may be the aggressive level or the racer level, but is not limited thereto.

In response to determining in S130 that the driving tendency level does not correspond to the predetermined level, the controller 100 may be configured to set the torque that corresponds to the optimal operating point of the engine to a final target engine torque (S160). In response to determining in S130 that the driving tendency level corresponds to the predetermined level, the controller 100 may be configured to determine whether the required torque is equal to or greater than a torque that corresponds to the optimal operating point of the engine (S140). In response to determining in S140 that the required torque is less than the torque that corresponds to the optimal operating point of the engine, the controller 100 may be configured to set the torque that corresponds to the optimal operating point of the engine to the final target engine torque (S160). In response to determining in S140 that the required torque is equal to or greater than the torque that corresponds to the optimal operating point of the engine, the controller 100 may be configured to adjust the target engine torque (S150). In particular, the controller 100 may be configured to increase the target engine torque up to a part-load max torque of the engine. The controller 100 may also be configured to set the adjusted target engine torque to the final target engine torque (S160).

The required torque may be implemented by the sum of the target engine torque and a motor assist torque. Therefore, when the torque that corresponds to the optimal operating point of the engine is set to the target engine torque, when the required torque is excessively increased, the motor assist torque may be excessively increased, such that the SOC of the battery 50 may be excessively decreased. When the target engine torque is output up to the part-load max torque, the motor assist torque may be decreased. Therefore, an excessive decrease of the SOC of the battery 50 may be prevented.

Figure 4:
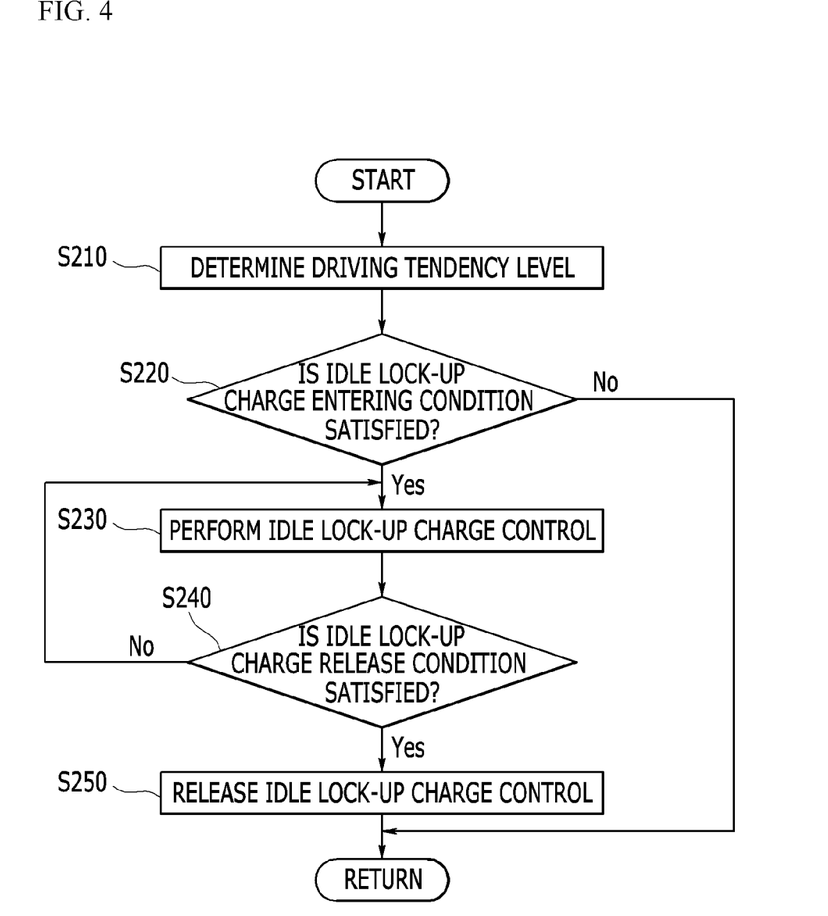
FIG. 4 is an exemplary flow chart showing a method for charging a battery using a driving tendency according to an exemplary embodiment of the present invention.
Figure 5:
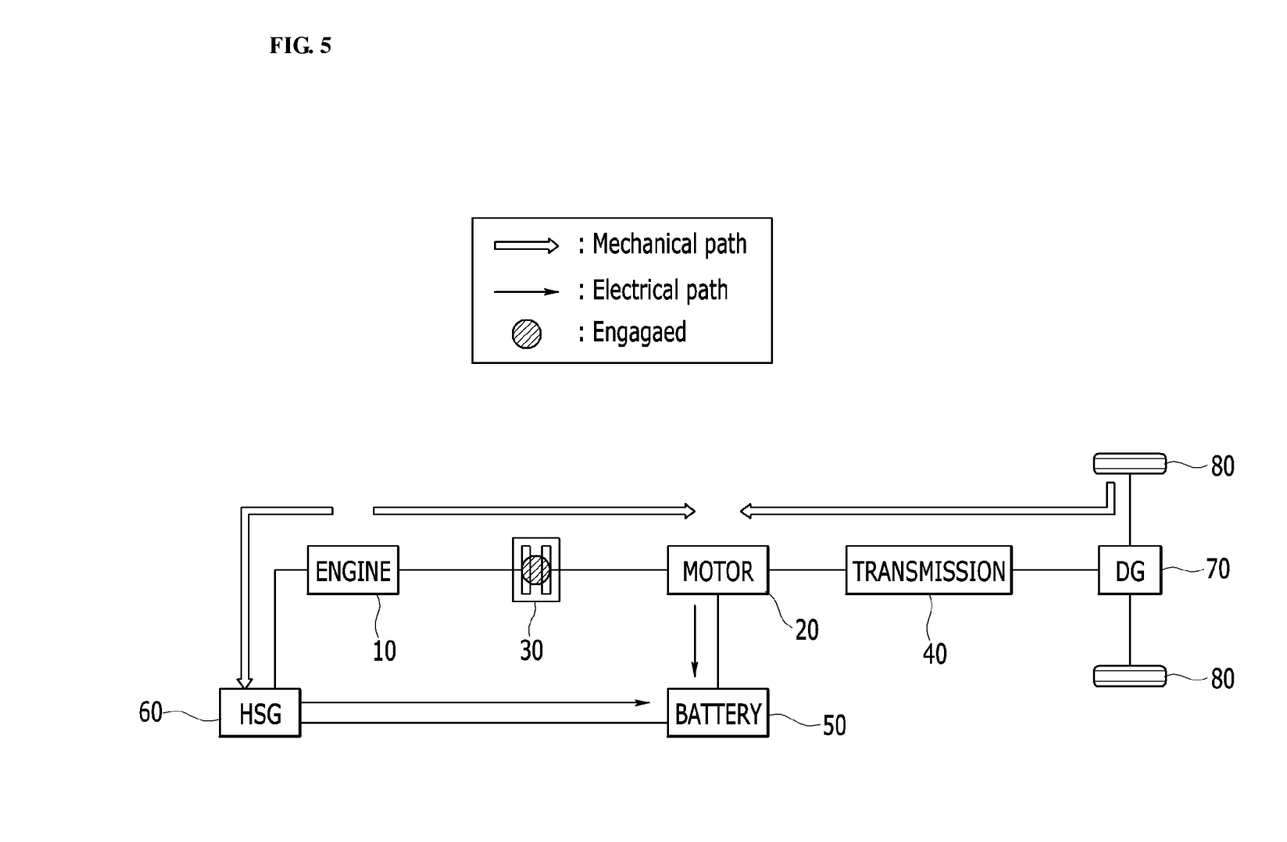
FIG. 5 is an exemplary diagram for describing a method for charging a battery according to an exemplary embodiment of the present invention.

FIG. 4 is an exemplary flow chart showing a method for charging a battery using a driving tendency according to an exemplary embodiment of the present invention. FIG. 5 is an exemplary diagram describing a method for charging a battery according to an exemplary embodiment of the present invention. As shown in FIG. 4, the method for charging a battery 50 according to an exemplary embodiment of the present invention starts with determining the driving tendency level based on the data to determine the driving tendency of the driver (S210). In other words, the controller 100 may be configured to calculate the driving tendency index based on the data detected by the data detector 90 and determine the driving tendency level of the driver based on the driving tendency index. The driving tendency level may be any one of the mild level, the normal level, the aggressive level, and the racer level.

The controller 100 may be configured to determine whether an idle lock-up charge entering condition is satisfied (S220). The idle lock-up charge entering condition may be considered to be satisfied when the engine 10 is in a driven state, the hybrid electric vehicle is in a coasting state, and the SOC of the battery 50 is less than or equal to an idle lock-up charge entering SOC. The coasting state may be determined based on the position value of the accelerator pedal and the position value of the brake pedal (e.g., degree of engagement or disengagement). The idle lock-up charge entering SOC may be set based on the driving tendency level. In other words, an idle lock-up charge entering SOC based on the aggressive level may be set to be greater than an idle lock-up charge entering SOC based on the normal level. In response to determining in S220 that the idle lock-up charge entering condition is not satisfied, the method for charging a battery using a driving tendency according to an exemplary embodiment of the present invention may terminate. In response to determining in S220 that the idle lock-up charge entering condition is satisfied, the controller 100 may be configured to perform an idle lock-up charge control (S230).

In the related art, a part-load charge control, an idle charge control, and a power limit control have been performed to charge the battery 50. The part-load charge control is a control used to charge the battery 50 by rotating the motor 20 by the power of the engine 10 when the accelerator pedal is engaged. The part-load charge control is used to maintain the SOC using residual power of the engine 10 when the vehicle speed is present in an entire SOC region. The idle charge control is used to charge the battery 50 by rotating the integrated starter and generator 60 by the power of the engine 10 regardless of the position value of the accelerator pedal, the position value of the brake pedal, and the vehicle speed to escape from a lowered SOC state. The power limit control is used to limit power used in an electronic component to escape from an excessively lowered SOC state.

The idle lock-up charge control is used to charge the battery 50 using both of the motor 20 and the integrated starter and generator 60. When the idle lock-up charge entering condition is satisfied, the controller 100 may be configured to maintain the engine clutch 30 in an engaged state and charge the battery 50 through electric power generation of the motor 20 and the integrated starter and generator 60. As shown in FIG. 5, since the motor 20 and the integrated starter and generator 60 generate the electric power using both of the power of the engine 10 and the torque of the wheel 80, charge efficiency may be more improved than the idle charge control in which only the integrated starter and generator 60 is used. Therefore, even when the vehicle is driven under a severe condition in which acceleration or deceleration is frequently generated, the SOC of the battery 50 may be maintained in a normal range.

Furthermore, the controller 100 may be configured to determine whether an idle lock-up charge release condition is satisfied (S240). The idle lock-up charge release condition may be considered to be satisfied when the coasting state is released or the SOC of the battery is equal to or greater than an idle lock-up charge release SOC. The idle lock-up release SOC may be set based on the driving tendency level. In other words, an idle lock-up release SOC based on the aggressive level may be set to be greater than an idle lock-up release SOC based on the normal level. In response to determining in S240 that the idle lock-up charge release condition is not satisfied, the controller 100 may proceed to S230. In response to determining in S240 that the idle lock-up charge release condition is satisfied, the controller 100 may be configured to release the idle lock-up charge control (S250), and terminate the method for charging a battery using a driving tendency according to an exemplary embodiment of the present invention.

Figure 6:
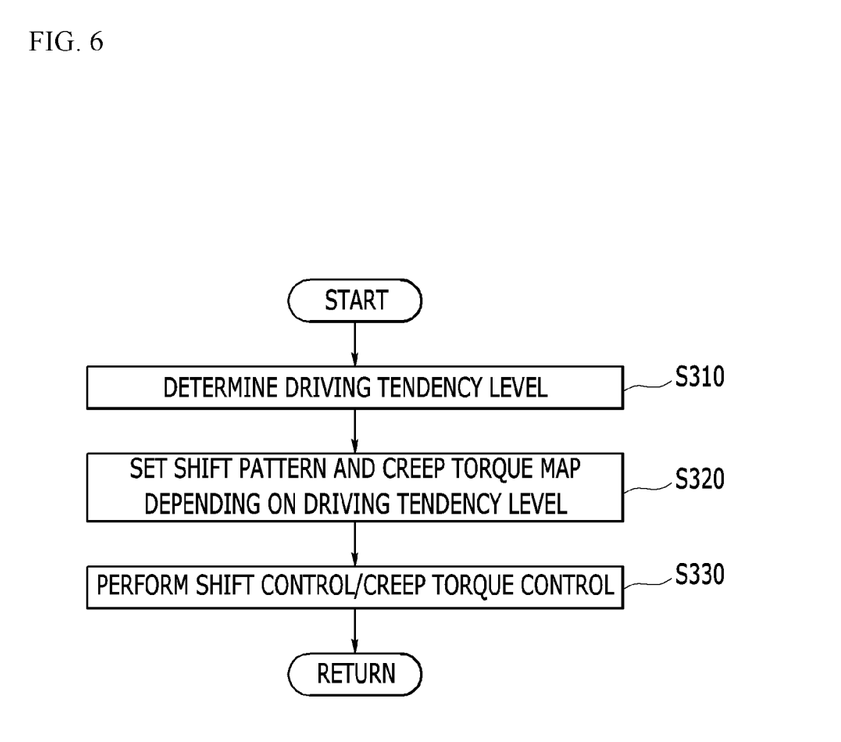
FIG. 6 is an exemplary flow chart showing a method for performing a shift control and a creep torque control using a driving tendency according to an exemplary embodiment of the present invention.
Figure 7:
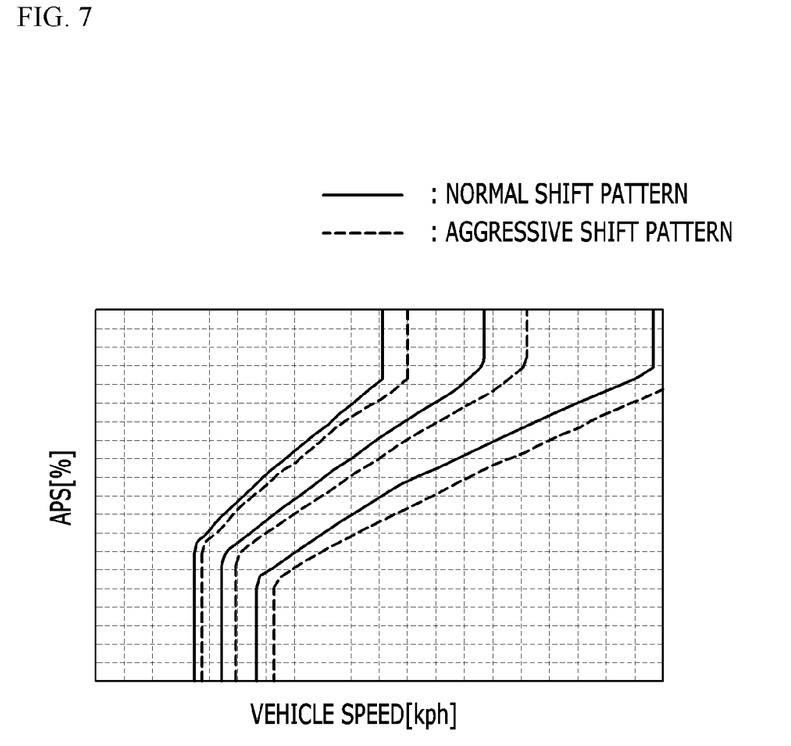
FIG. 7 is an exemplary diagram showing a shift pattern according to an exemplary embodiment of the present invention.

FIG. 6 is an exemplary flow chart showing a method for performing a shift control and a creep torque control using a driving tendency according to an exemplary embodiment of the present invention. FIG. 7 is an exemplary diagram showing a shift pattern according to an exemplary embodiment of the present invention. As shown in FIG. 6, the method for performing a shift control and a creep torque control according to an exemplary embodiment of the present invention starts with determining the driving tendency level based on the data to determine the driving tendency of the driver (S310). In other words, the controller 100 may be configured to calculate the driving tendency index based on the data detected by the data detector 90 and determine the driving tendency level of the driver based on the driving tendency index. The driving tendency level may be any one of the mild level, the normal level, the aggressive level, and the racer level.

The controller 100 may be configured to set a shift pattern and a creep torque map based on the driving tendency level (S320). As shown in FIG. 7, the shift pattern may be set differently based on the driving tendency level. The shift pattern may be any one of a mild shift pattern that corresponds to the mild level, a normal shift pattern that corresponds to the normal level, an aggressive shift pattern that corresponds to the aggressive level, and a racer shift pattern that corresponds to the racer level. A target creep torque that corresponds to a given condition may be stored in the creep torque map. Creep driving may refer to that the hybrid electric vehicle is driven by only the torque of the motor 20 when the accelerator pedal is disengaged. The target creep torque may be a torque required during the creep driving.

The controller 100 may be configured to perform the shift control based on the shift pattern (S330). As shown in FIG. 7, a shift may be performed at a relative lower vehicle speed when the driving tendency level is the normal level than when the driving tendency level is the aggressive level. Therefore, a shift feel appropriate for the driving tendency of the driver may be provided, and when the driving tendency level is the aggressive level or the racer level, an average RPM of the engine 10 may increase, thereby making it possible to maintain the SOC of the battery 50 in a normal range. In addition, the controller 100 may be configured to perform the creep torque control using the creep torque map based on the vehicle speed and the shift stage. The shift stage may be determined based on the shift pattern set based on the driving tendency level. Therefore, the creep torque appropriate for the driving tendency of the driver may be generated.

Figure 8:
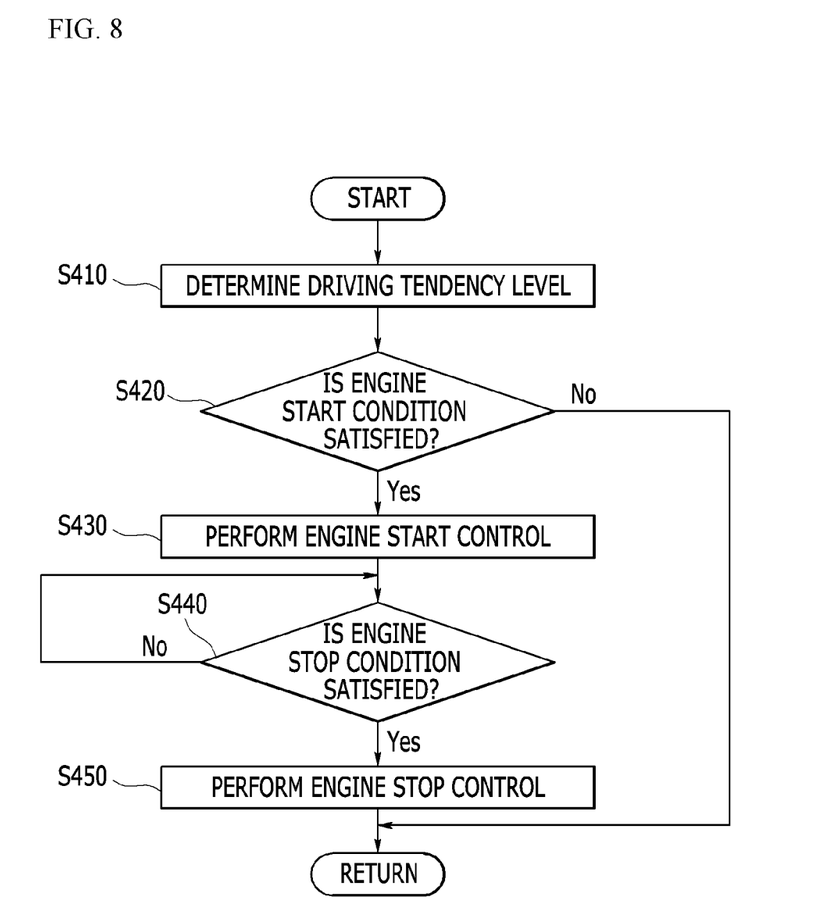
FIG. 8 is an exemplary flow chart showing a method for performing an engine start control using a driving tendency according to an exemplary embodiment of the present invention.

FIG. 8 is an exemplary flow chart showing a method for performing an engine start control using a driving tendency according to an exemplary embodiment of the present invention. As shown in FIG. 8, the method for performing an engine start control according to an exemplary embodiment of the present invention starts with determining the driving tendency level based on the data to determine the driving tendency of the driver (S410). In other words, the controller 100 may be configured to calculate the driving tendency index based on the data detected by the data detector 90 and determine the driving tendency level based on the driving tendency index. The driving tendency level may be any one of the mild level, the normal level, the aggressive level, and the racer level.

The controller 100 may be configured to determine whether an engine start condition is satisfied when the engine is stopped (S420). The engine start condition may be considered to be satisfied when power required by the driver is equal to or greater than a first threshold value. The power required by the driver may be calculated based on the required torque and the vehicle speed, and the first threshold value may be set based on the driving tendency level. In other words, a first threshold value based on the aggressive level may be set to be less than a first threshold value based on the normal level.

In addition, the engine start condition may be considered to be satisfied when accumulated driving energy is equal to or greater than a second threshold value. The accumulated driving energy may be calculated based on the required power during a predetermined time in a section in which a change rate of the position value of the accelerator pedal is a positive value. The second threshold value may be set based on the driving tendency level. In other words, a second threshold value based on the aggressive level may be set to be less than a second threshold value based on the normal level.

In response to determining in S420 that the engine start condition is not satisfied, the method for performing an engine start control using a driving tendency according to an exemplary embodiment of the present invention may terminate. In response to determining in S420 that the engine start condition is satisfied, the controller 100 may be configured to perform the engine start control (S430). A mode of the hybrid electric vehicle may be converted from the EV mode into the HEV mode based on the engine start control.

Furthermore, the controller 100 may be configured to determine whether an engine stop condition is satisfied (S440). The engine stop condition may be considered to be satisfied when power required by the driver is less than or equal to a third threshold value. The third threshold value may be set based on the driving tendency level. In other words, a third threshold value based on the aggressive level may be set to be greater than a third threshold value based on the normal level. In response to determining in S440 that the engine stop condition is satisfied, the controller 100 may be configured to perform an engine stop control (S450) and terminate the method for performing an engine start control using a driving tendency according to an exemplary embodiment of the present invention.

As described above, according to an exemplary embodiment of the present invention, the hybrid electric vehicle may be controlled using the driving tendency of the driver, thereby making it possible to optimize the SOC of the battery 50 and improve the fuel efficiency. In addition, the intention of the driver may be more accurately reflected in the shift.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling a hybrid electric vehicle using a driving tendency, comprising:
    determining, by a controller, a driving tendency level based on data to determine a driving tendency of a driver;
    determining, by the controller, a target engine torque using an engine torque map based on a vehicle speed and a required torque;
    determining, by the controller, whether the driving tendency level corresponds to a predetermined level;
    determining, by the controller, whether the required torque is equal to or greater than a torque that corresponds to an optimal operating point of an engine when the driving tendency level corresponds to the predetermined level; and
    adjusting, by the controller, the target engine torque when the required torque is equal to or greater than the torque that corresponds to the optimal operating point of the engine.

2. The method for controlling a hybrid electric vehicle using a driving tendency of claim 1, wherein in the adjustment of the target engine torque, the target engine torque is increased up to a part-load max torque of the engine to decrease a motor assist torque.

3. The method for controlling a hybrid electric vehicle using a driving tendency of claim 1, further comprising:
    setting, by the controller, a final target engine torque to the torque that corresponds to the optimal operating point of the engine when the required torque is less than the torque that corresponds to the optimal operating point of the engine.

4. A method for controlling a hybrid electric vehicle using a driving tendency, comprising:
    a memory configured to store program instructions; and
    a processor configured to execute the program instructions, the program instructions when executed configured to:
        determine a driving tendency level based on data to determine a driving tendency of a driver;
        determine a target engine torque using an engine torque map based on a vehicle speed and a required torque;
        determine whether the driving tendency level corresponds to a predetermined level;
        determine whether the required torque is equal to or greater than a torque that corresponds to an optimal operating point of an engine when the driving tendency level corresponds to the predetermined level; and
        adjust the target engine torque when the required torque is equal to or greater than the torque that corresponds to the optimal operating point of the engine.

5. The system of claim 4, wherein in the adjustment of the target engine torque, the target engine torque is increased up to a part-load max torque of the engine to decrease a motor assist torque.

6. The system of claim 4, wherein the program instructions when executed are further configured to:
    set a final target engine torque to the torque that corresponds to the optimal operating point of the engine when the required torque is less than the torque that corresponds to the optimal operating point of the engine.

7. A non-transitory computer readable medium containing program instructions executed by a controller, the computer readable medium comprising:
    program instructions that determine a driving tendency level based on data to determine a driving tendency of a driver;
    program instructions that determine a target engine torque using an engine torque map based on a vehicle speed and a required torque;
    program instructions that determine whether the driving tendency level corresponds to a predetermined level;
    program instructions that determine whether the required torque is equal to or greater than a torque that corresponds to an optimal operating point of an engine when the driving tendency level corresponds to the predetermined level; and
    program instructions that adjust the target engine torque when the required torque is equal to or greater than the torque that corresponds to the optimal operating point of the engine.

8. The non-transitory computer readable medium of claim 7, wherein in the adjustment of the target engine torque, the target engine torque is increased up to a part-load max torque of the engine to decrease a motor assist torque.

9. The non-transitory computer readable medium of claim 7, further comprising:
    program instructions that set a final target engine torque to the torque that corresponds to the optimal operating point of the engine when the required torque is less than the torque that corresponds to the optimal operating point of the engine.

* * * * *